United States Patent [19]

Beumer

[11] Patent Number: 5,081,915
[45] Date of Patent: Jan. 21, 1992

[54] MACHINE FOR BREWING HOT BEVERAGES

[75] Inventor: Klaus Beumer, Solingen, Fed. Rep. of Germany

[73] Assignee: Robert Krups Stiftung & Co. KG., Solingen, Fed. Rep. of Germany

[21] Appl. No.: 474,153

[22] Filed: Feb. 2, 1990

[30] Foreign Application Priority Data

Feb. 14, 1989 [DE] Fed. Rep. of Germany ....... 3904378

[51] Int. Cl.$^5$ .................. A47J 31/057; A23F 5/00
[52] U.S. Cl. .................. 99/281; 99/288; 99/306
[58] Field of Search ........... 99/300, 304, 306, 288, 99/279, 281, 282, 283; 219/429, 430, 432, 433, 434, 436; 392/467

[56] References Cited

U.S. PATENT DOCUMENTS

| | | |
|---|---|---|
| 3,953,923 | 5/1976 | Rygmyr .............. 392/467 |
| 4,150,607 | 4/1979 | Kemp ................ 99/279 |
| 4,155,291 | 5/1979 | Ryckman, Jr. et al. ........ 99/282 |
| 4,160,152 | 7/1979 | Wightman et al. .......... 219/433 |
| 4,214,148 | 7/1980 | Fleischhauser ............. 99/281 |
| 4,331,067 | 5/1982 | Mysicka et al. ............ 392/467 |
| 4,356,381 | 10/1982 | Flaherty, Jr. et al. ........ 392/467 |
| 4,558,204 | 12/1985 | Bleckmann .............. 219/436 |
| 4,683,812 | 8/1987 | Tarlow et al. ............. 99/306 |
| 4,741,259 | 5/1988 | Ogata et al. ............. 99/279 |
| 4,748,901 | 6/1988 | Burmeister ............... 99/306 |
| 4,790,240 | 12/1988 | Henn ................... 99/282 |
| 4,843,955 | 7/1989 | Henn ................... 99/295 |

FOREIGN PATENT DOCUMENTS

| | | | |
|---|---|---|---|
| 1082276 | 7/1980 | Canada ................. 99/281 |
| 2258394 | 6/1974 | Fed. Rep. of Germany ........ 99/282 |
| 2258897 | 6/1974 | Fed. Rep. of Germany ........ 99/282 |
| 2821878 | 4/1979 | Fed. Rep. of Germany ........ 99/281 |
| 3709268 | 9/1988 | Fed. Rep. of Germany ........ 99/302 |

Primary Examiner—William A. Cuchlinski, Jr.
Assistant Examiner—John L. Beres
Attorney, Agent, or Firm—Peter K. Kontler

[57] ABSTRACT

A machine for brewing coffee or other hot beverages has a hollow base which is open at the underside and has a top portion provided with an opening for a warming plate. The warming plate is assembled with a ring-shaped insulator, an electric heater and a bridge into a unit which is thereupon inserted into the base by way of the open underside before the underside is closed by a detachable bottom. The bridge biases the heater against the warming plate, and its ends are received in openings of the insulator. The central section of the bridge has elastic fingers which engage the toothed peripheral surface of a post at the underside of the warming plate to ensure that the bias of the bridge upon the heater remains unchanged. The base has integral coupling members which extend into openings of the insulator, and the latter has prong-like detent members which engage the marginal portion of the warming plate.

21 Claims, 7 Drawing Sheets

FIG. 22

MACHINE FOR BREWING HOT BEVERAGES

BACKGROUND OF THE INVENTION

The invention relates to improvements in machines for brewing hot beverages, and more particularly to improvements in coffee making, tea making or like machines wherein electrical, electronic and other components are installed in the interior of a hollow base forming part of or constituting the housing of the machine.

An automatic coffee maker of the type to which the present invention pertains comprises a container for fresh water on top of the base, a warming plate in the base, an electric heater in the base beneath the warming plate, a filter holder which can receive filter paper with a metered quantity of flavoring agent (such as ground coffee beans), and conduits for conveying water from the container to the heater and from the heater to the filter holder. The latter is or can be supported by a vessel, such as a coffee pot, which gathers freshly brewed coffee and rests on the warming plate. It is also known to install the warming plate in a ring-shaped insulator which confines an annular seal of the warming plate and surrounds a bridge serving to bias the electric heater against the underside of the warming plate so that the heater can heat water and can also maintain the warming plate at a desired temperature. Reference may be had, for example, to published German patent application No. 25 45 548 which discloses a sheet metal warming plate and an electric heater (a so-called through flow heater) adjacent the underside of the warming plate. The heater is engaged by three yokes having end portions cooperating with internal projections of the hollow base of the housing to urge the heater against the warming plate. The internal projections of the base are adjacent an opening for the warming plate, and each such projection has a tapped blind bore for a portion of a screw. The shanks of the screws also extend through the respective yokes and can carry distancing elements. A drawback of the just described machine is that the assembly of its parts is a time-consuming operation because the screws can be applied only after the warming plate, the electric heater and the yokes are already inserted into the base of the housing. Moreover, at least one of the several screws is likely to become loose when the machine is in use to thus affect the exchange of heat between the electric heater and the warming plate.

Published German patent application No. 34 15 167 discloses a machine wherein the underside of the warming plate carries a screw or bolt which cooperates with a nut to maintain the heater in contact with the warming plate. A drawback of this machine is that the extent of heat exchange between the warming plate and the electric heater depends upon the axial position of the nut relative to the screw or bolt. Such position can be altered if the machine is subjected to vibratory or other stresses which are likely to loosen the nut.

It is further known to employ a yoke which can be attached to a screw at the underside of the warming plate and is used to maintain the electric heater in contact with the warming plate. The shank of the screw extends through a hole provided in the yoke and bounded by a smooth surface. The screw cooperates with a nut to urge the yoke against the electric heater and to thus maintain the heater in contact with the warming plate. The free ends of the yoke engage an insulator which is installed in the base of the housing. This machine exhibits the drawbacks of the aforediscussed machines, i.e., it is necessary to rely on externally and internally threaded connecting elements and such elements are likely to become loose in response to vibration and/or other stray movements of the machine.

OBJECTS OF THE INVENTION

An object of the invention is to provide a machine for brewing coffee, tea or other beverages wherein the exchange of heat between the warming plate and the electric heater is less likely to be affected by stray movements of the housing than in conventional machines.

Another object of the invention is to provide a novel and improved preassembled unit which includes a warming plate and an electric heater and is ready for installation in the housing of a coffee making or like machine.

A further object of the invention is to provide a novel and improved method of assembling the components of a machine for brewing coffee, tea or other hot beverages.

An additional object of the invention is to provide a machine wherein the connection between the warming plate and the electric heater need not employ any internally and/or externally threaded parts.

Still another object of the invention is to provide novel and improved connections between the components in the hollow housing of a coffee making or like machine.

An additional object of the invention is to provide a novel and improved insulator for use in the above outlined machine.

A further object of the invention is to provide a novel and improved device which serves to bias the warming plate and the electric heater against each other.

Another object of the invention is to provide a novel and improved housing for use in the above outlined machine and to provide a novel and improved bottom for the housing.

An additional object of the invention is to provide a machine which can be assembled or taken apart within a fraction of the time that is required to assemble or dismantle a conventional machine.

A further object of the invention is to provide a novel and improved coffee maker.

Another object of the invention is to provide a coffee making or like machine wherein the number of parts in the hosing is less than in a standard machine.

SUMMARY OF THE INVENTION

The invention is embodied in a machine for making hot beverages (e.g., in a coffee or tea maker). The improved machine comprises a housing including a hollow base having a top portion provided with an opening, and a preassembled unit which is located in the hollow base and includes a warming plate disposed at the opening and having an underside provided with a retaining element, an upper side which can support a vessel (such as a coffee pot or a tea pot), and a preferably round or substantially round marginal portion. The unit further comprises sealing means located at the upper side and adjacent the marginal portion of the plate, or substantially ring-shaped electric insulator at the underside of the plate, detent means connecting the insulator with the plate, an electric heater adjacent the underside of the plate, and means for biasing the heater against the plate (so that the latter is heated and can heat the beverage in the vessel at its upper side). The biasing means includes a first portion which engages the retaining element of the plate and a second portion which engages the insulator, and the machine further comprises means for coupling the preassembled unit to the base.

The biasing means can include an elongated bridge having a median portion which constitutes the first portion of the biasing means and two ends which constitute the second portion of the biasing means. The retaining element can include a post or stud which is at least partially surrounded by the median portion of the biasing means.

In accordance with a presently preferred embodiment, the substantially ring-shaped insulator comprises an annular top wall and a skirt which is integral with and extends downwardly from the top wall and has a plurality of openings including first openings for the second portion of the biasing means and second openings. The coupling means comprises male coupling members provided on the base and extending into the second openings of the skirt. The latter can be provided with two projections or legs extending in a direction away from the top wall of the insulator and disposed substantially diametrically opposite each other. The first openings (for the second portion of the biasing means) are preferably provided in the projections of the skirt. Each projection can include a forked end portion which is remote from the top wall of the insulator.

The openings of the skirt further include third openings and the skirt further comprises the aforementioned detent means including tongues which are provided in or at the third openings and engage the marginal portion of the warming plate. The skirt surrounds the warming plate and its tongues are elastically deformable. Each such tongue can include a platform for the marginal portion of the warming plate and a ramp adjacent each platform and serving to guide the marginal portion of the warming plate toward and onto the respective platform during insertion of the marginal portion into the insulator.

The bridge of the biasing means can constitute a one-piece elongated strip-shaped metallic part having a main section of a first width and two ends of a second width less than the first width. The ends of the strip-shaped bridge form part of or constitute the second portion of the biasing means, and the first portion of the biasing means can include two tongues provided in the main section and having confronting surfaces defining a space for the retaining element of the warming plate. As mentioned above, the retaining element can include a post or stud, and such post has a peripheral surface which is engaged by the surfaces of the tongues. The stud or post can be bonded (particularly welded) to the central portion of the warming plate and its peripheral surface is preferably roughened to prevent slippage of the surfaces of tongues along such peripheral surface. For example, the peripheral surface of the post can be provided with teeth.

The ends of the strip-shaped bridge can include first bent-over lugs and the central section of the bridge can include second bent-over lugs adjacent the respective first lugs. The first and second lugs serve to engage the insulator. The central section of the bridge can be provided with apertures which flank the tongues and additional lugs which are adjacent the apertures and serve to engage the electric heater at the underside of the warming plate. Such additional lugs preferably constitute integral portions of the central section of the bridge and are bent out of the respective apertures.

The central section of the bridge can be provided with additional tongues or prongs which are preferably adjacent the ends of the bridge and serve to engage and retain at least one conductor, e.g., a conductor which connects the electric heating element or elements of the heater with the ground.

The hollow base of the machine can include an upright section and a horizontal section, and the aforementioned top portion preferably forms part of the horizontal section. The latter further includes a sidewall which surrounds the opening in the top portion, and the aforementioned coupling members are provided on the sidewall. As mentioned above, the coupling members extend into the second openings in the skirt of the insulator. Each coupling member can constitute an integral extension of the sidewall of the horizontal section.

The base has an open underside and openings adjacent the open underside, and the machine further comprises a bottom for the base. The bottom is provided with springy male detent members which are received in the openings of the base to releasably couple the bottom to the base. The bottom can be provided with a substantially U-shaped or C-shaped peripheral portion including an inner wall and an outer wall. The detent members are or can be integral with the inner wall. The underside of the bottom can be provided with a cable-collecting chamber, preferably an annular chamber which surrounds the external surface of a raised portion of the bottom. The bottom can further comprise means for releasably retaining convolutions of cable in the chamber, and such retaining means can include one or more rigid or elastic fingers extending across one or more portions of the chamber. The cable serves to connect the current-consuming parts of the machine with a source of electrical energy, e.g., with a household outlet.

The novel features which are considered as characteristic of the invention are set forth in particular in the appended claims. The improved machine itself, however, both as to its construction and the mode of assembling the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
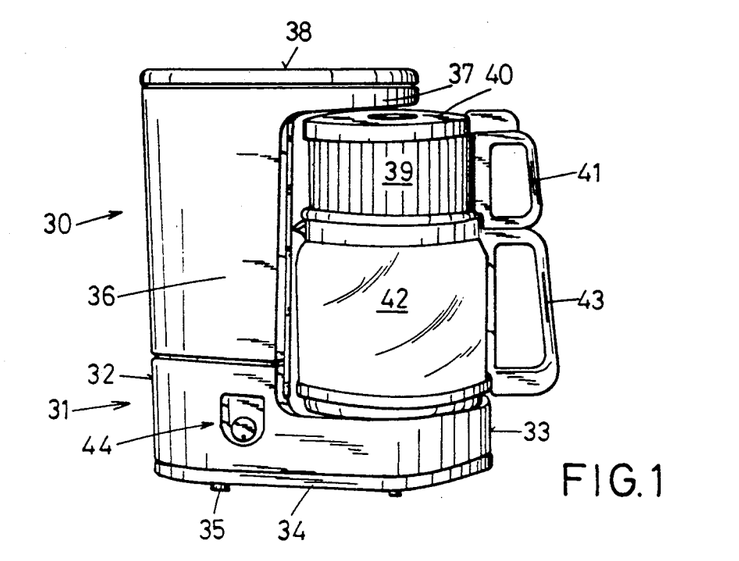
FIG. 1 is a schematic perspective view of a coffee or tea making machine which embodies one form of the invention.

FIG. 1 shows a machine 30 for brewing hot beverages, such as coffee, tea or hot chocolate. The illustrated machine 30 is assumed to be a coffee maker, e.g., of the type known as "BREWMASTER JR.", "BREWMASTER" or "BREWMASTER II", all produced and distributed by the assignee of the present application. Numerous parts of the improved machine 30 can be identical with or analogous to corresponding parts of the above-enumerated commercially available coffee makers. Such parts can include, among others, the electric water heating means, the means for conveying heated water into contact with a supply of ground coffee beans, the container for fresh water, the vessel which serves for collection and temporary storage of freshly brewed coffee, and various switching and control elements in or on the housing of the machine 30. Therefore, the drawing shows only those parts of the improved machine which are necessary for full understanding of the invention. All other parts which are necessary to render the machine 30 operative are or can be identical with those in the above-enumerated and/or other machines which are produced and distributed by the assignee. The various switching and control elements of the machine are provided on or in the housing, particularly in a hollow base 31 which constitutes the main or the only component of the housing.

Figure 8:
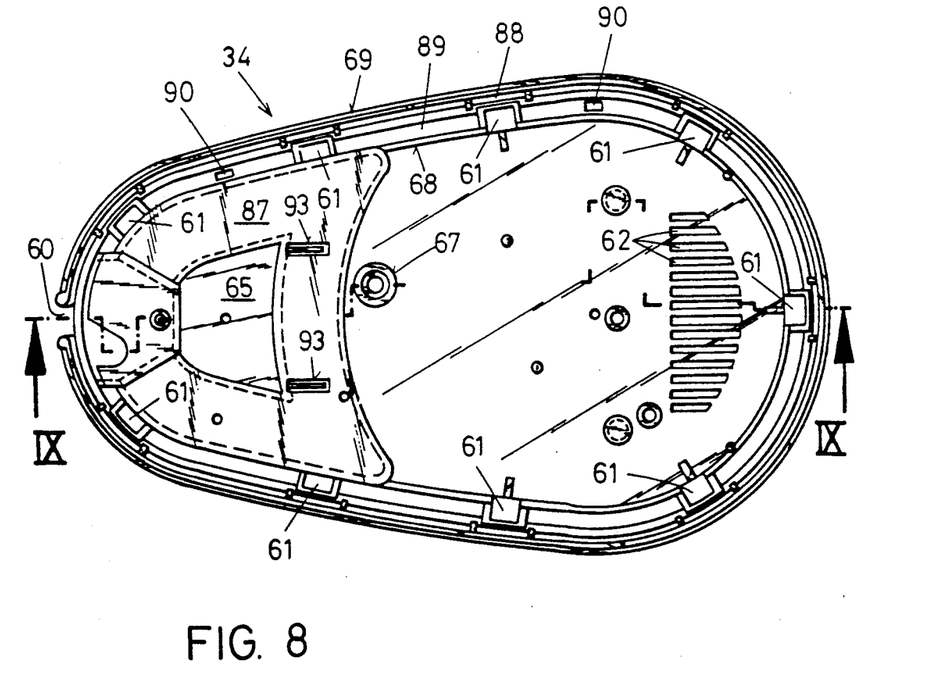
FIG. 8 is a plan view of a bottom for the open underside of the base which is shown in FIGS. 1 to 7.
Figure 9:
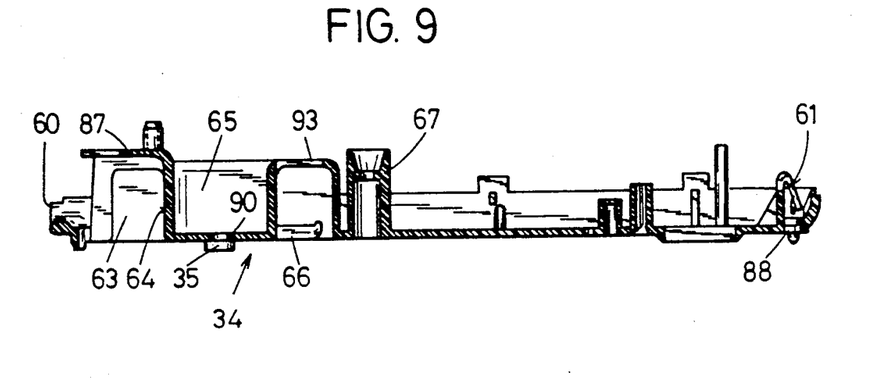
FIG. 9 is a sectional view of the bottom as seen in the direction of arrows from the line IX—IX of FIG. 8.
Figure 10:
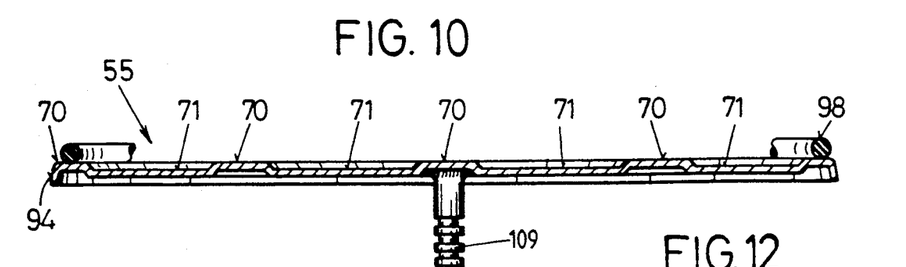
FIG. 10 is a central sectional view of the warming plate of the machine which is shown in FIG. 1.
Figure 11:
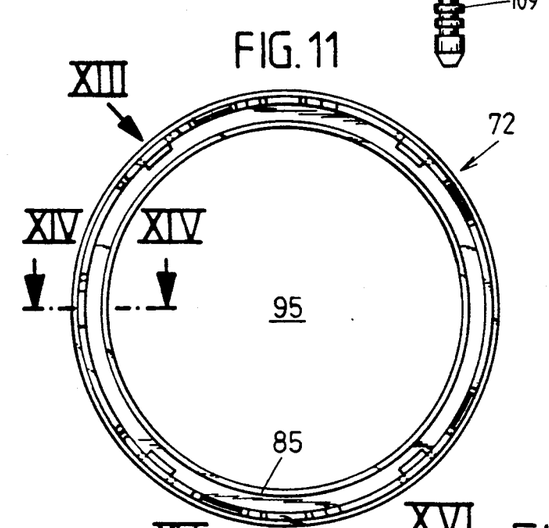
FIG. 11 is a bottom plan view of a ring-shaped electrical insulator forming part of the unit for insertion into the hollow base of the machine which is shown in FIG. 1.
Figure 12:
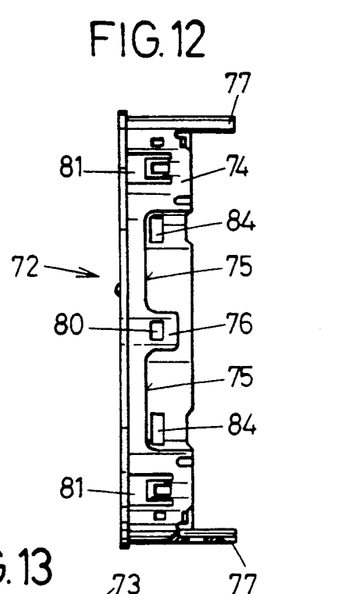
FIG. 12 is a side elevational view of the insulator.

The base 31 of the machine 30 has a substantially L-shaped outline (see particularly FIG. 2) with an upright section 32 and an elongated horizontal section 33. The entire base 31 can be made of a single piece of plastic or other suitable material of the type often employed for the making of housings which form part of electric appliances. The underside of the base 31 is open, and such underside is adjacent an array of spaced-apart substantially rectangular openings 58. The open underside of the base 31 permits convenient introduction of a unit which is assembled in accordance with a feature of the present invention and includes a circular disc-shaped warming plate 55 (FIG. 10), a ring-shaped electrical insulator 72 (FIGS. 11 to 16), a ring-shaped sealing element 98 adjacent the upper side of a marginal portion 94 of the warming plate 55, an electric heater 52 (FIGS. 21 and 22), and an elongated strip-shaped resilient bridge 86 (FIGS. 17-18) which serves as a means for biasing the heater 52 against the underside of the warming plate 55. The open underside of the base 31 permits convenient introduction and installation of at least some of the aforediscussed electrical and electronic switching and control elements in the internal space 45 of the hollow base 31. When the introduction of such components and of the aforementioned unit is completed, the underside of the base 31 is closed by a specially designed bottom 34 the details of which are shown in FIGS. 8 and 9. The bottom 34 is provided with several legs 35 which are preferably made of an elastomeric material and come to rest on a counter top, on a table or on another support for the machine 30.

Figure 2:
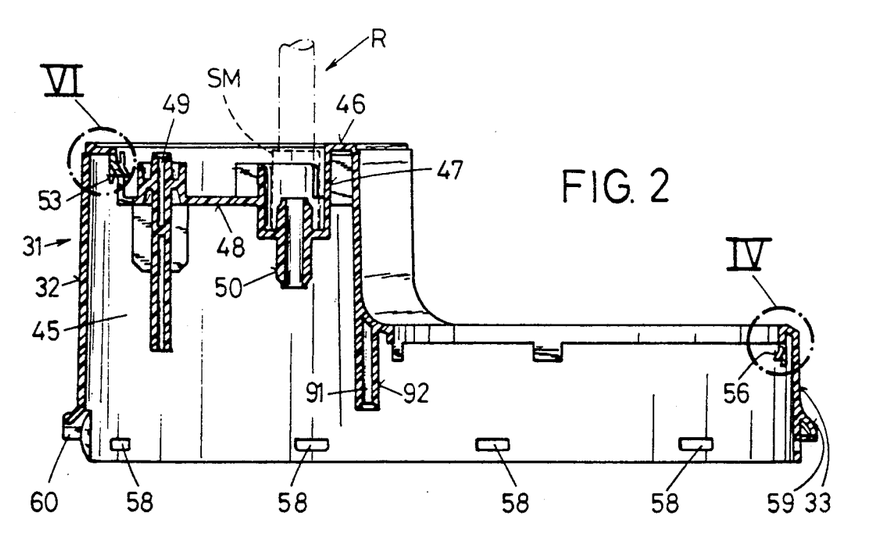
FIG. 2 is an enlarged longitudinal vertical sectional view of the hollow base of the housing in the machine of FIG. 1.
Figure 3:
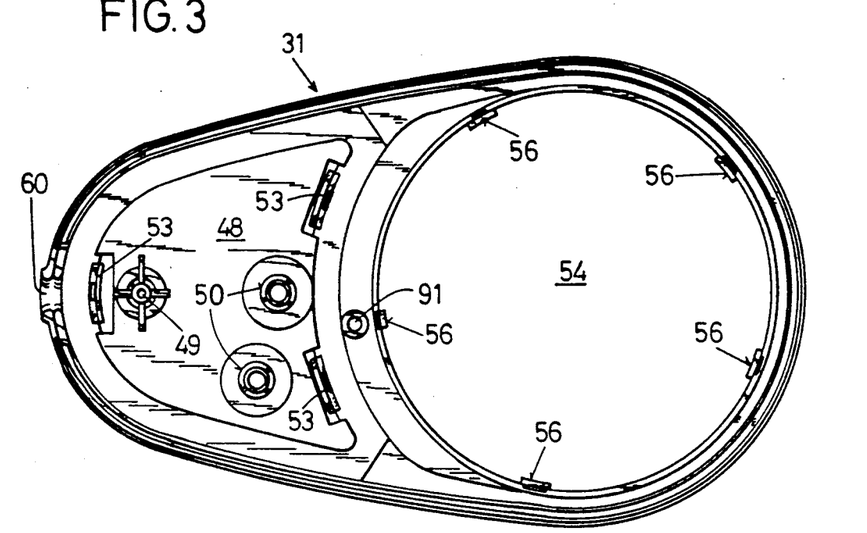
FIG. 3 is a bottom plan view of the base.
Figure 21:
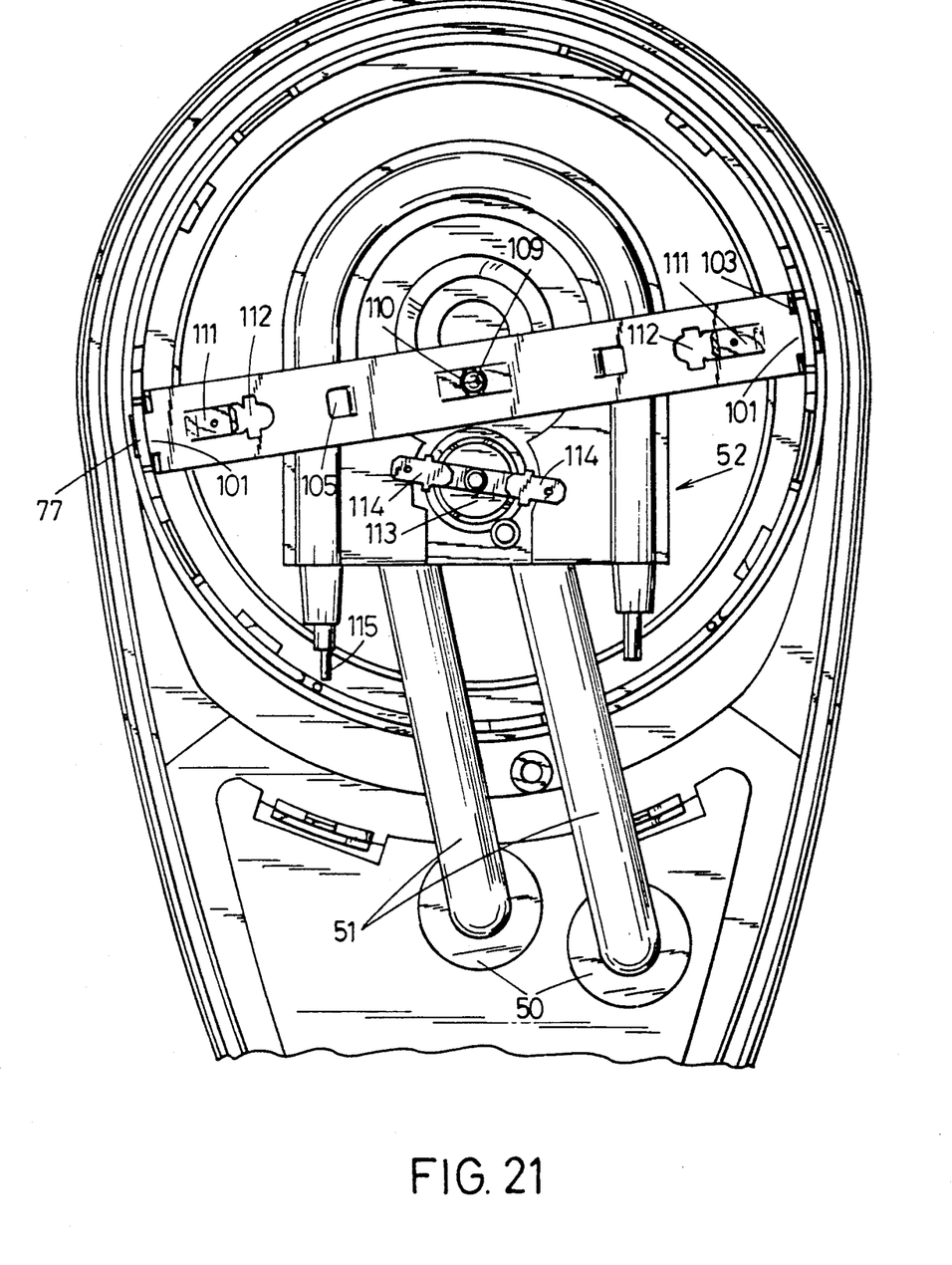
FIG. 21 is a fragmentary bottom plan view of the base and of the preassembled unit therein.

The electric heater 52 is preferably a so-called through flow heater which defines a path for the flow of fresh water from a container 36 above the upright section 32 of the base 31 into a riser R (reference may also be had to commonly owned U.S. Pat. Nos. 4,790,240 and 4,843,955 to Henn et al.) which supplies hot water into a filter holder 39 above a coffee pot 42 resting on the warming plate 55, i.e., above the horizontal section 33 of the base 31. FIG. 21 shows two conduits 51 one of which supplies fresh water from the container 36 to the electric heater 52 and the other of which supplies hot water from the heater 52 into the riser R for admission into the filter holder 39. The conduits 51 can constitute rigid or flexible pipes or hoses. A substantial portion of the riser R is confined in the container 36 (reference may be had again to the aforementioned patents to Henn et al.). FIGS. 2 and 3 show that the top portion 46 of the upright section 32 is provided with two nipples 50 one of which receives fresh water from the container 36 and serves to supply a stream of water into one of the conduits 51. The other conduit 51 is connected with the second nipple 50 of the top portion 46, and this second nipple 50 is further connected with the lower end portion of the riser R. The upper end portion of the riser R is substantially horizontal and is confined in a horizontal extension 37 of the container 36 above the filter holder 39. The extension 37 has an outlet serving to discharge hot water into the filter holder 39 which has an apertured top wall 40 and a handle 41. The manner in which the filter holder 39 can receive a bag of filter paper for a metered quantity of flavoring agent (such as ground coffee beans) and the manner in which the bottom wall of the filter holder discharges freshly brewed beverage into the pot 42 forms no part of the present invention. The pot 42 can be made of glass or another light-transmitting material and is provided with a handle 43.

The container 36 has a pivotable or removable cover or lid 38 which can be pivoted to open position or removed in order to permit refilling of the container with fresh water. The cover 38 can constitute a rigid one-piece part or it can include a first portion which is permanently affixed to the top of the container 36 and a second portion which is pivotable relative to the first portion between open and closed positions. The two portions of the two-piece cover are connected to each other by one or more hinges, e.g., in a manner as in the aforementioned commercially available coffee makers of the assignee.

FIG. 1 further shows an electric on-off switch 44 which is installed in the upright section 32 of the base 31 and constitutes one of the aforediscussed switching and control elements. A lamp (not specifically shown) can be installed in or adjacent the switch 44 to light up when the machine 30 is on, i.e., when the electric heater 52 is connected with a source of electrical energy. The switch 44 is preferably installed in that part of the upright section 32 which is adjacent the horizontal section 33 of the base 31.

The base 31 is made of a single piece of electrically insulating plastic material and the top portion 46 of its upright section 32 has a recessed central part 47 with a bottom panel 48 above the adjacent portion of the internal space 45. The bottom panel 48 is integral with the aforementioned nipples 50 (FIGS. 2 and 3). Those portions of the nipples 50 which extend above the bottom panel 48 are engaged by suitable sealing members, e.g., relatively short cylindrical sleeves of rubber or other elastomeric material. One of these sealing members is shown in FIG. 2 by broken lines, as at SM. One of the nipples 50 receives fresh water from the container 36 and the other nipple 50 admits hot water into the lower end portion of the riser R. Those portions of the nipples 50 which extend downwardly beyond the bottom panel 48 are connected with the respective conduits 51. The aforementioned path for the flow of water through the electric heater 52 is or can be defined by an arcuate pipe having ends connected with the conduits 51.

Figure 6:
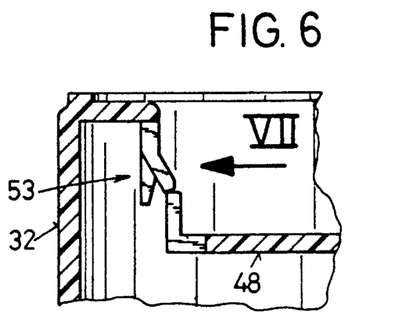
FIG. 6 is a greatly enlarged view of a detail within the phantom-line circle VI in FIG. 2.
Figure 7:
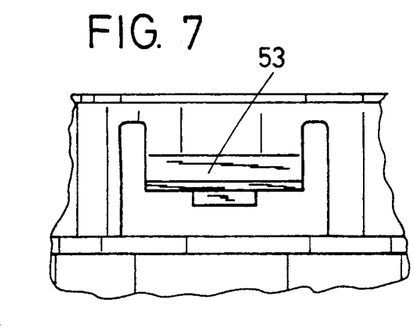
FIG. 7 is a view as seen in the direction of arrow VII in FIG. 6.

The arrangement is preferably such that the container 36 can be simply lifted off and placed back onto the top portion 46 of the upright section 32 of the base 31. To this end, the bottom wall of the container 36 can be provided with two nipples which are insertable into and extractable from the respective sealing members SM and one of which can constitute or confine the lower end portion of the riser R. The top portion 46 of the upright section 32 is provided with three spaced apart detent members 53 (see particularly FIGS. 6 and 7) which engage complementary detent members of the container 36 when the latter is properly mounted on the top portion 46. The detent members 53 are provided in part on the bottom panel 48 and in part on the sidewall of the central part 47 of the top portion 46. Each detent member 53 includes a wider portion and a narrower portion (FIG. 7).

The machine 30 is or can be provided with additional means for mechanically connecting the container 36 to the base 31. Such additional connecting means comprises an elongated screw or another suitable externally threaded member (not shown) which is introduced into the container 36 from above so that its shank extends through a hole in the bottom wall of the container and is driven into an elongated tubular socket 49 of top portion 46 of the upright section 32.

Figure 4:
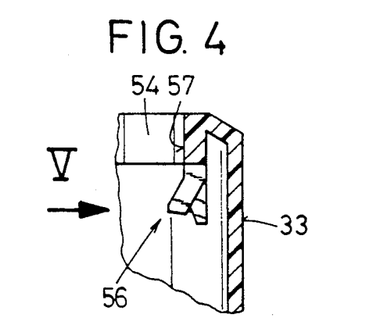
FIG. 4 is a greatly enlarged view of a detail within the phantom-line circle IV in FIG. 2.
Figure 5:
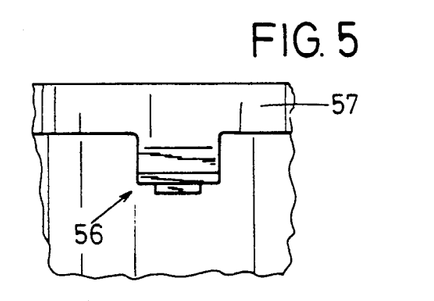
FIG. 5 is a view as seen in the direction of arrow V in FIG. 4.

The horizontal top portion of section 33 of the base 31 has a circular opening 54 (FIG. 3) which is surrounded by a downwardly extending circumferentially complete sidewall 57 (FIGS. 4 and 5) having integral coupling means composed of five preferably equidistant and preferably identical coupling members 56 which can releasably engage and hold the aforementioned insulator 72 of the preassembled unit. Each coupling member 56 can be said to constitute a downwardly projecting integral extension of the sidewall 57, and each of these coupling members includes a relatively wide upper portion and a narrower lower portion behind the wider portion. The wider portions of the coupling members 56 face toward the opening 54 in the top portion of the horizontal section 33.

The bottom 34 is provided with springy male detent members 61 which extend into the preferably rectangular openings 58 (FIG. 2) close to the open underside of the base 31. The openings 58 are disposed at a level slightly below an external rim 59 which is an integral part of the base 31 and is interrupted at 60 to provide room for introduction of an electric cable (not shown) into the internal space 45. The rim 59 overlies the adjacent marginal portion of the bottom 34 when the male detent members 61 are properly received in the respective openings 58. The interruption 60 of the rim 59 is disposed at one (narrower) end of the base 31 which latter has a substantially elliptical outline (FIG. 3). The interruption 60 of the rim 59 defines approximately one-half of a passage for introduction of a cable into the internal space 45; the other half of such passage is constituted by a substantially mirror symmetrical second interruption 60 (FIGS. 8 and 9) in the adjacent narrower end portion of the bottom 34. The two interruptions 60 together establish a substantially round passage for the cable, and more particularly for a customary protective sheath surrounding that portion of the cable which extends between the section 32 and bottom 34 into the internal space 45 of the base 31.

The bottom 34 is preferably made of a single piece of suitable electrically insulating material and has the same (substantially oval) outline (FIG. 8) as the base 31. The radius of curvature of the outline of that portion of the bottom 34 which is located beneath the section 33 is larger than the radius of curvature of the cover portion beneath the upright section 32. The marginal portion the bottom 34 includes an outer wall 69 which is substantially normal to the median portion of the cover and includes a relatively thin top portion received in the rim 59 of the section 33 when the detent members 61 extend into the respective openings 58. The aforementioned second interruption 60 for the cable is provided in the outer wall 69. The latter is spaced apart from and surrounds an inner wall 68 of the marginal portion of the bottom 34. The inner wall 68 includes a raised portion or platform 87 which is located beneath the upright section 32. The walls 68, 69 are integral with a bottom wall 89 which has a first set of relatively large openings 88 and a second set of smaller openings 90. The openings 88 are located beneath the respective detent members 61 which are integral parts of the inner wall 68 and each of which has a substantially C-shaped cross-sectional outline. One end of each detent member 61 has an engaging and retaining portion which is received in the respective opening 58 when the bottom 34 is properly affixed to the base 31. The detent members 61 yield during assembly of the bottom 34 with the base 31 and thereupon dissipate energy to introduce their engaging and retaining portions into the adjacent openings 58 at the open underside of the base 31.

The smaller openings 90 in the bottom wall 89 between the walls 68, 69 of marginal portion of the bottom 34 constitute or form part of sockets or chambers for portions of the legs 35 (FIG. 9). Such portions of the preferably elastic legs 35 are or can be forcibly introduced into the respective openings 90 to be held by friction against separation from the bottom 34.

The bottom 34 further includes a cylindrical portion 67 for a portion of an externally threaded fastener which also extends into the tapped or untapped bore or hole 91 of a sleeve 92 forming an integral part of the base 31 and being located in the space 45 between the sections 32 and 33 (see FIG. 2).

The platform or raised portion 87 of the inner wall 68 of the bottom 34 has a substantially centrally located depression 65 surrounded by a wall having an external surface 64, which, in turn, is surrounded by a substantially annular cable collecting chamber 63 accessible at the underside of the bottom 34. The electric cable which extends from the integral space 45 of the base 31 through the two interruptions 60 can be convoluted onto the surface 64 to partially or completely fill the collecting chamber 63 when the machine 30 is not in use or when the exposed portion of the cable is too long and should be moved out of the way by confining a selected length in the chamber 63. One, two or more preferably (but not necessarily) elastic fingers 66 are provided to serve as a means for releasably retaining one or more convolutions of the cable in the collecting chamber 63. For example, the bottom 34 can be provided with two spaced-apart fingers 66 each of which is integral with the deepmost portion of the platform 87 beneath the depression 65 and extends across the adjacent portion of the chamber 63. Each of the fingers 66 is located at a level beneath an elongated slot 93 in the platform 87.

The bottom 34 is further provided with an array of parallel elongated slots 62 which are disposed beneath the opening 54 and establish communication between the internal space 45 and the surrounding atmosphere to permit escape of heat which is generated by the electric heater 52 when the machine 30 is in use. FIG. 8 shows shorter, medium long and longer slots 62; however, it is clear that all of the slots 62 can have the same length as well as that the distribution of slots 62 can be different from that which is shown in FIG. 8.

The warming plate 55 (FIG. 10) is a circular disc which is made of a single piece of a metallic material, preferably a good conductor of heat. This plate has several upwardly extending raised portions 70 including a centrally located raised portion and two radially spaced apart annular raised portions. The upper sides of the two inner raised portions 70 serve to support the bottom wall of the coffee pot 42. The raised portions 70 alternate with shallow annular grooves 71 which can be formed in a stamping machine during making of the warming plate 55. The radially outermost raised portion 70 is integral with the downwardly extending marginal portion 94 which is overlapped by the sealing member 98. The latter is located between the marginal portion 94 and a top wall or panel 73 (FIG. 13-16) of the insulator 72 when the aforementioned unit is assembled.

A presently preferred form of the ring-shaped insulator 72 is shown in FIGS. 11 to 16 and 22. This part is made of a single piece of electrically insulating material and includes the relatively smooth annular top wall or panel 73 and a cylindrical skirt 74 which is integral with and extends downwardly from the top panel 73. The latter includes a downwardly extending collar 85 which is spacedly surrounded by and defines with the upper portion of the skirt 74 an annular compartment 97. The circular opening 95 of the top panel 73 is preferably concentric with the opening 54 in the top portion of the section 33 in assembled condition of the machine 30. The upper side of the warming plate 55 is located in the opening 95 when the aforementioned unit is ready to be introduced into the internal space 45 of the base 31. The diameter of the opening 95 is selected in such a way that this opening can receive the bottom portion of the coffee pot 42 so that the pot is properly centered when it rests on the warming plate 55. At such time, the collar 85 prevents or limits the extent of lateral movement of the pot 42 along the upper side of the warming plate 55.

As mentioned above, the skirt 74 of the illustrated insulator 72 is a relatively short cylinder which spacedly surrounds the collar 85 and has three sets or groups of openings 78, 80 and 84, and 81. Furthermore, the skirt 74 has a relatively long recess or cutout 75 which extends in the circumferential direction of the rim 85 and is divided into two halves by an axially parallel partition 76 of the skirt. The opening 80 is provided in the partition 76. The recess or cutout 75 is oriented in such a way that its halves can receive portions of the aforementioned conduits 51 (FIG. 21).

Figure 13:
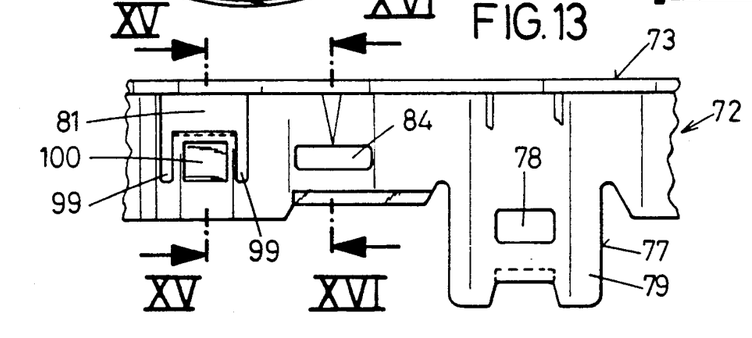
FIG. 13 is a greatly enlarged view of a detail of the insulator, substantially as seen in the direction of arrow XIII in FIG. 11.

The skirt 74 of the insulator 72 further comprises two projections 77 which extend in a direction away from the top panel 73 and have forked free or lower end portions 79. Each projection 77 is formed with one of the openings 78. The projections 77 are or can be located diametrically opposite each other. Each opening 78 has a rectangular outline and extends substantially transversely of the respective projection 77 (FIG. 13). The purpose of the openings 78 is to receive the free ends 101 (FIGS. 17, 18) of the aforementioned elongated strip-shaped bridge 86 which serves as a means for biasing the electric heater 52 against the underside of the warming plate 55 in assembled condition of the aforementioned unit including the heater 52, the warming plate 55, the sealing means 98, the insulator 72 and the bridge 86.

Figure 14:
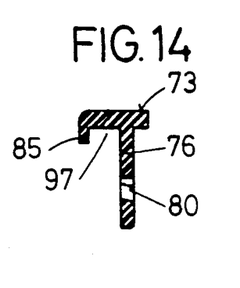
FIG. 14 is an enlarged sectional view substantially as seen in the direction of arrows from the line XIV—XIV of FIG. 11.
Figure 16:
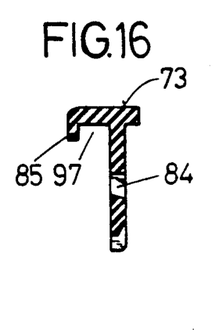
FIG. 16 is a sectional view substantially as seen in the direction of arrows from the line XVI—XVI of FIG. 13.

FIG. 14 shows a section of the insulator 72 in a plane extending across one of the openings 80 and halving the partition 76 between the two halves of the recess 75. FIG. 16 shows another section, namely in a plane extending across one of the openings 84. Each of the openings 84 resembles an elongated rectangular window (FIG. 13) extending in the circumferential direction of the skirt 74. The opening 80 and the openings 84 receive the male coupling members 56 of horizontal section 33 of the base 31 to releasably hold the assembled unit in the internal space 45 of the base 31. The skirt 74 can have four openings or windows 84 and one opening 80, i.e., a total of five because the illustrated section 33 is provided with five coupling members 56.

Figure 15:
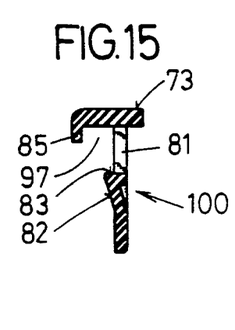
FIG. 15 is a sectional view substantially as seen in the direction of arrows from the line XV—XV of FIG. 13.

FIG. 15 shows the skirt 74 in a further sectional view, namely in a plane extending across one of the openings 81 which are disposed close to and below the top panel 73 and have narrow parallel slot-like extensions 99 (FIG. 13) flanking detent members in the form of prongs or tongues 100 which serve to engage and releasably hold the marginal portion 94 of the warming plate 55. Each opening 81 has a substantially rectangular upper portion and two extensions 99. The inner side of each tongue 100 is provided with a ramp 82 terminating at a platform 83 for the adjacent part of marginal portion 94 of the warming plate 55. The ramps 82 of the tongues 100 guide the marginal portion 94 toward and onto the respective platforms 83. When the warming plate 55 is properly assembled with the insulator 72, its marginal portion 94 is received in the annular compartment 97 between the collar 85 and the skirt 74, and such marginal portion 94 rests on the platforms 83 of the tongues 100. The sealing member 98 resembles a rope with a circular cross-sectional outline and is confined in the annular compartment 97 of the insulator 72 when the marginal portion 94 of the warming plate 55 rests on the platforms 83 of the tongues 100. FIG. 15 shows that the platforms 83 actually extend into the adjacent openings 81 of the skirt 74. The skirt 74 of FIGS. 11 to 16 has four preferably equidistant tongues 100. These tongues preferably constitute the only detent means for separably connecting the warming plate 55 to the insulator 72.

Figure 17:
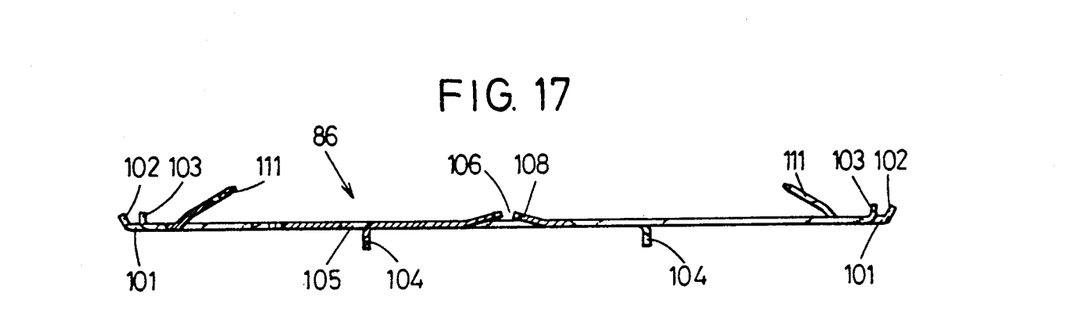
FIG. 17 is a partly elevational and partly central longitudinal sectional view of a one-piece strip-shaped resilient bridge which serves to bias the electric heater against the warming plate.
Figure 18:
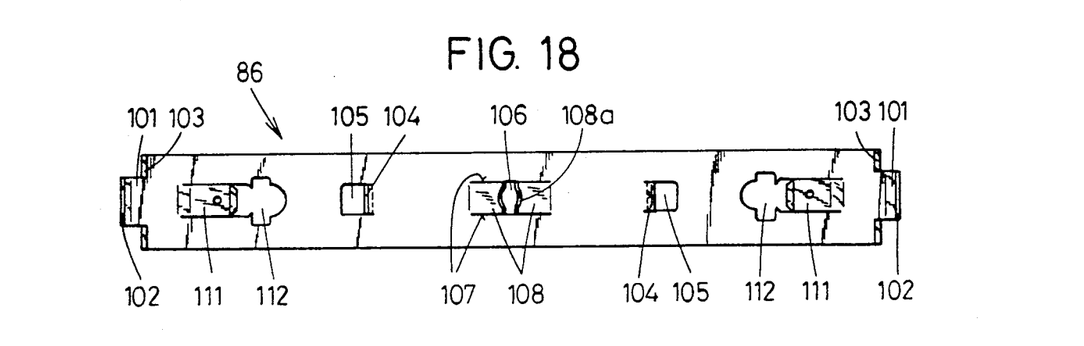
FIG. 18 is a bottom plan view of the bridge.
Figure 22:
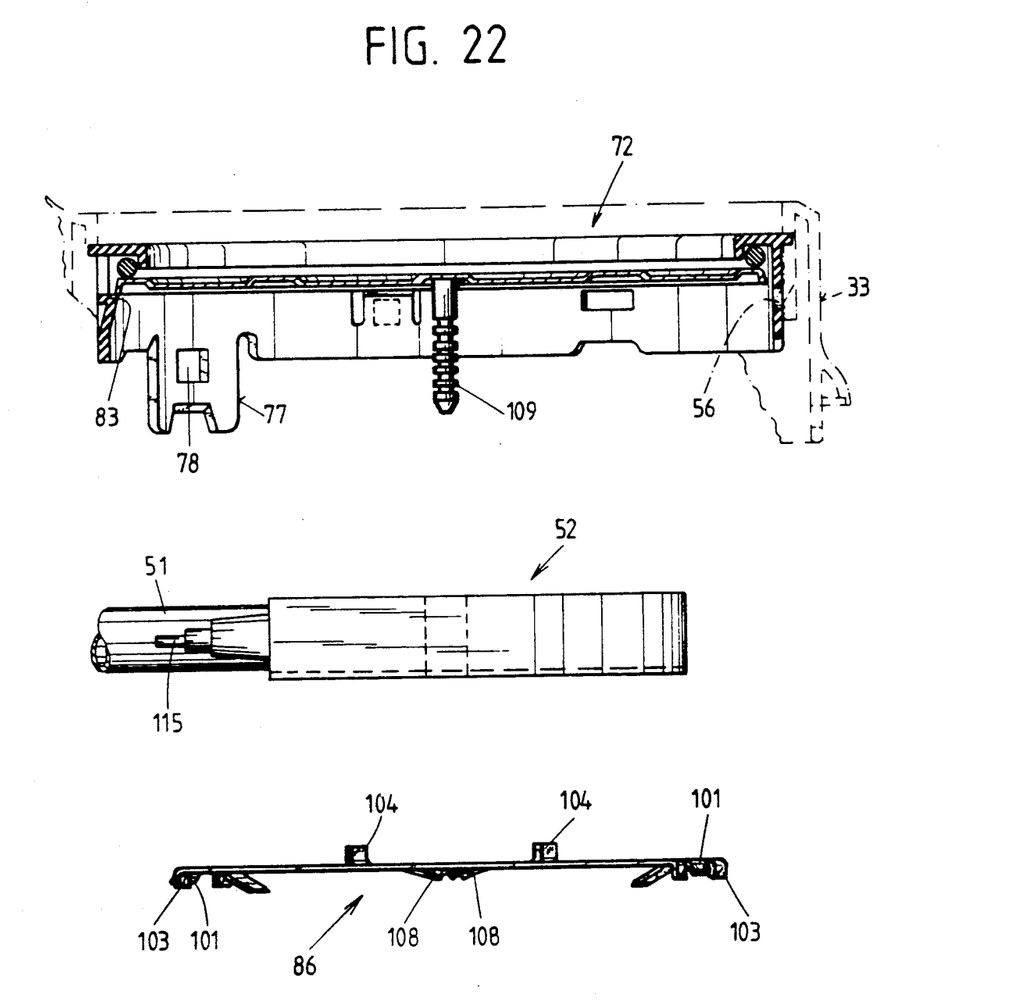
FIG. 22 is an exploded view of three parts of the structure which is shown in FIG. 21.

The bridge 86 of FIGS. 17, 18 and 22 is made of a single piece of elongated strip-shaped resilient metallic stock and includes a relatively wide central section and the two narrower ends 101. When the ends 101 are received in the respective openings 78 of projections 77 forming part of the skirt 74, the central section of the bridge 86 maintains the heater 52 in satisfactory heat exchanging engagement with the underside of the warming plate 55 so that the temperature of the warming plate is maintained at a level which is necessary to maintain the beverage in the coffee pot 42 on the warming plate at a desired temperature. The central section of the bridge 86 has a rectangular outline and its median portion includes two springy tongues 108 having confronting concave surfaces 108a defining a passage 106 for an elongated retaining element in the form of a post or stud 109 (FIG. 21) which is secured (preferably bonded and most preferably welded) to and extends downwardly from the central portion of the underside of the warming plate 55. The tongues 108 together constitute a first portion of the bridge 86 and serve to secure the bridge to the retaining element 109 of the warming plate 55. The ends 101 constitute a second portion of the bridge 86 and serve to separably connect this bridge with the projections 77 of the skirt 74, i.e., with the insulator 72.

The free ends 101 have bent-over lugs 102 which are outwardly adjacent bent-over lugs 103 at the respective ends of the central section of the bridge 86. The lugs 102 engage the outer sides of the respective projections 77, and the lugs 103 are inwardly adjacent the respective projections 77 when the ends 101 extend through the adjacent openings 78. Each lug 103 includes two spaced-apart aligned portions (see FIG. 18). FIG. 21 shows the aforementioned unit in assembled condition and further shows the manner in which the ends 101 of the bridge 86 cooperate with the projections 77 of the skirt 74 to ensure that the wide central section of the bridge can cause the heater 52 to abut and to transmit heat to the warming plate 55.

The tongues 108 in the central section of the bridge 86 are obtained by providing the central section with a central opening (passage 106) and with two pairs of parallel slits 107. The surfaces 108a of the tongues 108 are preferably provided with sharp edges to reliably engage the peripheral surface 110 of the retaining element 109 of the warming plate 55. In order to further reduce the likelihood of accidental or unintentional shifting of the retaining element 109 and tongues 108 relative to each other in the axial direction of the retaining element, the peripheral surface 110 is preferably corrugated and/or otherwise roughened; for example, the peripheral surface 110 can be provided with teeth which cooperate with the sharp edges of concave surfaces 108a to maintain the tongues 108 in engagement with a selected portion of the peripheral surface 110. The retaining element 109 extends into the internal space 45 of the base 31 in a direction away from the opening 54 and is sufficiently long to ensure that it can be properly engaged by the tongues 108 while the electric heater 52 abuts the underside of the warming plate 55 and the bridge 86 overlies the adjacent side of the heater. All that is necessary is to push the bridge 86 toward the heater 52 so that the tip of the retaining element 109 penetrates into the passage 106 and its peripheral surface 110 is engaged by the concave surfaces 108a of the tongues 108. The resilient bridge 86 stores energy when its ends 101 are received in the respective openings 78 so that it can ensure satisfactory exchange of heat between the electric heater 52 and the warming plate 55.

The central section of the bridge 86 is further provided with two apertures 105 which flank the tongues 108 and are formed for the purpose of obtaining two additional bent-over lugs 104. These lugs engage and hold the adjacent portions of the electric heater 52 between the bridge 86 and the warming plate 55.

Still further, the bridge 86 comprises two additional tongues 111 each of which is disposed between one of the ends 101 and one of the apertures 105. The tongues 111 are bent from the general plane of central section of the bridge 86 and serve to retain a conductor (not shown) which connects the heater 52 or the cable to the ground in a manner which is known from the art of coffee making and tea making machines with electric heaters and forms no part of the present invention. The additional tongues 111 are adjacent specially configurated slots or windows 112 which are provided in the central section of the bridge 86.

Figure 19:
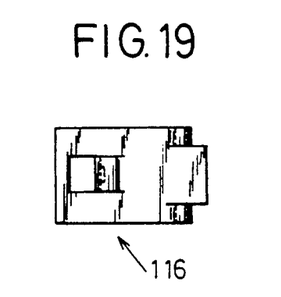
FIG. 19 is a plan view of a clamp which is used in the machine of FIG. 1.
Figure 20:
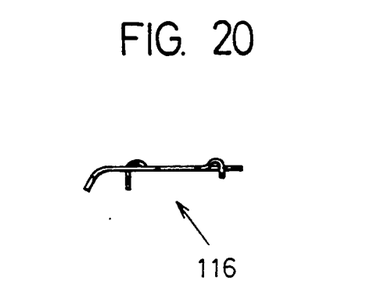
FIG. 20 is a side elevational view of the clamp.

FIGS. 19 and 20 show a conventional one-piece metallic clamp 116 which serves to connect the bridge 86 with a fire preventing fuse, not shown, in a manner not forming part of the invention.

A thermostat 113 (FIG. 21) is connected with the electric heater 52 in a conventional manner. This thermostat is a commercially available device and the mode of connecting it with the heater 52 is also known. The reference characters 114 denote in FIG. 21 two electric terminals which are adjacent the thermostat 113 and each of which is connected with an electrical conductor, not shown. The heater 52 includes an electric heating element, e.g., an electric resistance heater having a wire 115. This wire is connected in an electric circuit in the same way as in the afore-enumerated commercially available machines of the assignee.

FIG. 21 shows a portion of the base 31 from below, with the bottom 34 detached. The properly assembled unit including the warming plate 55, the sealing means 98, the heater 52, the insulator 72 and the bridge 86 is installed in the internal space 45 of the base 31 and is separably connected to the section 33 by the aforediscussed coupling members 56. Furthermore, the conduits 51 connect the pipe of the electric heater 52 with the nipples 50 on the top portion 46 of the upright section 32 of the base 31.

The components of the unit in the internal space 45 of the base 31 can be assembled in the following order: The first step can involve the assembly of the warming plate 55 and its sealing means 98 with the insulator 72, i.e., the marginal portion 94 of the warming plate is pushed along the ramps 82 of the detent members or tongues 100 until it reaches and comes to rest on the platforms 83. At such time, the sealing means 98 is confined in the annular compartment 97 between the collar 85 and the skirt 74 of the insulator 72. The resulting subassembly consisting of the components 55, 72 and 98 is then assembled with the bridge 86, i.e., the retaining element 109 is caused to enter the passage 106 in the central section of the bridge, and the tongues 104 of the bridge maintain the heater 52 in an optimum position in which the conduits 51 can extend into the respective halves 75 in the skirt 74, i.e., the conduits 51 are located at opposite sides of the partition 76. The ends 101 of the bridge 86 are inserted into the respective openings 78, and the thus completed unit is ready to be inserted into the internal space 45 and to be held therein by the coupling members 56 which extend into the respective openings 80, 84 of the skirt 74. The conduits 51 are then secured to the corresponding nipples 50 and the last step includes attachment of the bottom 34, i.e., insertion of springy male detent members 61 into the respective openings 58 adjacent the open underside of the base 31.

An important advantage of the improved machine is that a substantial number of its parts or components can be assembled into a unit outside of the housing and the entire unit can be inserted into and properly retained in the housing by resorting exclusively to releasable coupling means (56). The connections between the components of the preassembled unit need not employ any threaded or analogous mechanical fasteners but can consist solely of simple and inexpensive male and female detent members. This applies for connection of the warming plate 55 and its sealing means 98 to the insulator 72 as well as for connection of the heater 52 to the warming plate and for connection of the bridge 86 to the insulator. The male and female detent members form integral parts of the cooperating components which constitute the preassembled unit. Such integral detent members are formed at the time the respective components are made in a press, in a stamping machine or in another suitable machine.

It is not even necessary to positively secure the electric heater 52 to the warming plate 55, i.e., the bridge 86 simply biases the heater against the underside of the warming plate to establish a desirable exchange of heat between the components 52 and 55. Furthermore, it is not necessary to employ a discrete nut in order to separably connect the bridge 86 to the retaining element 109 of the warming plate 55; the elastic tongues 108 (which are integral with the central section of the bridge) replace a discrete nut and cooperate with the toothed peripheral surface 110 of the retaining element 109 to prevent any shifting of the heater 52 with reference to the warming plate 55 or vice versa. The absence of the need for one or more nuts contributes to a further reduction of the interval of time which is required to assemble a substantial number of components into a unit which is ready for introduction into the base 31. The integral elastic tongues 108 of the bridge 86 exhibit the additional advantage that they are much less likely to become disengaged from the retaining element 109 and/or to permit a weakening of the force with which the heater 52 is biased against the warming plate 55 than if the unit were to employ a nut as a means for urging the central section of the bridge 86 against the heater. Thus, vibrations and/or any other undesirable stray movements of the machine 30 are much less likely to loosen the connection between the retaining element 109 and the tongues 108 than a connection which employs one or more nuts.

The threaded member which is to enter the socket 49 of the base 31 constitutes an optional part, the same as the threaded member which is to extend through the cylindrical portion 67 of the bottom 34 and to enter the bore or hole 91 of the sleeve 92. In other words, the connection between the container 36 and the base 31 can consist solely of detent elements (53), and the connection between the base 31 and the bottom 34 can also consist exclusively of detent means (58, 61).

The concave surfaces 108a of the tongues 108 can be shaped (e.g., chamfered) in order to provide each of these surfaces with at least one reasonably sharp edge which can reliably engage a selected tooth on the peripheral surface 110 of the retaining element 109. The teeth of the peripheral surface 110 can constitute annular ribs which alternate with annular grooves for the edges of concave surfaces 108a.

The depth of the annular cable-receiving chamber 63 at the underside of the bottom 34 is preferably selected in such a way that the entire exposed length of the cable can be confined in this chamber without projecting beyond the underside of the bottom 34. This ensures that the convoluted and confined cable cannot interfere with the placing of legs 35 into contact with the top of a counter, table or another support for the machine 30. The two fingers 66 of the bottom 34 may but need not be identical; as explained above, the bottom 34 can be provided with a single finger 66 or with three or more fingers.

The improved machine is susceptible of many additional modifications without departing from the spirit of the invention. For example, the warming plate 55 and other components of the unit can be used with equal advantage in other types of coffee making, tea making or other beverage brewing machines. Furthermore, the configuration of the bridge 86 can depart from that which is shown in FIGS. 17-18, and the same holds true for all or nearly all other components of the unit as well as for the base 31 and bottom 34. For example, the ends 101 of the bridge 86 can be provided with female detent elements which are engageable by male detent elements of projections 77 on the skirt 74 of the insulator 72. The same holds true for the retaining element 109 and the tongues 108, i.e., the element 109 or its equivalent can be provided on the bridge to be engaged by tongues of the warming plate 55.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A machine for brewing hot beverages, comprising a housing including a hollow base and having a top portion provided with an opening; a preassembled unit located in said base and including a warming plate disposed at said opening and having an underside provided with a retaining element, an upper side and a marginal portion, sealing means located at the upper side of said plate at said marginal portion, a substantially ring-shaped electrical insulator at said marginal portion, detent means connecting said insulator with said plate, an electric heater adjacent the underside of said plate, and means for biasing said heater against said plate including a first portion engaging said retaining element and a second portion engaging said insulator, said biasing means comprising a one-piece elongated strip-shaped metallic bridge having a central section of a first width and two ends of a second width less than said first width, said ends forming part of said second portion of said biasing means and said first portion of said biasing means including two tongues having confronting surfaces defining a passage for said retaining element, said retaining element including a post having a peripheral surface which is engaged by the surfaces of said tongues; and means for coupling said unit to said base.

2. The machine of claim 1, wherein said plate has a central portion and said post is bonded to said central portion, the peripheral surface of said post being roughened to prevent slippage of the surfaces of said tongues there along.

3. The machine of claim 1, wherein said peripheral surface of said post is toothed.

4. The machine of claim 1, wherein the ends of said bridge include first bent-over lugs and said central section has second bent-over lugs adjacent the respective first lugs, said first and second lugs engaging said insulator.

5. The machine of claim 1, wherein said central section has apertures flanking said tongues and lugs adjacent said apertures and engaging said heater.

6. The machine of claim 5, wherein said lugs constitute integral portions of said central section and are bent out of the respective apertures.

7. The machine of claim 1, wherein said central section includes conductor-engaging additional tongues adjacent said ends.

8. The machine of claim 1, wherein said base includes an upright section and a horizontal section, said top portion forming part of said horizontal section and said horizontal section further having a sidewall surrounding said opening, said coupling means being provided on said sidewall and said insulator having openings for said coupling means.

9. The machine of claim 8, wherein said coupling means comprises a plurality of coupling members constituting integral extensions of said sidewall.

10. The machine of claim 1, wherein said base has an open underside and additional openings adjacent said underside, and further comprising a bottom for said base, said bottom having springy male detent members in said additional openings.

11. The machine of claim 10, wherein said bottom has a substantially U-shaped peripheral portion including an inner wall and an outer wall, said detent members being integral with said inner wall.

12. A machine for brewing hot beverages, comprising a housing having an open underside and including a hollow base and a top portion provided with an opening; a preassembled unit located in said base and including a warming plate disposed at said opening and having an underside provided with a retaining element, an upper side and a marginal portion, sealing means located at the upper side of said plate at said marginal portion, a substantially ring-shaped electrical insulator at said marginal portion, detent means connecting said insulator with said plate, an electric heater adjacent the underside of said plate, and means for biasing said heater against said plate including a first portion engaging said retaining element and a second portion engaging said insulator, means for coupling said unit to said base; a bottom for the underside of said base; and detent means for releasably connecting said bottom to said base, said bottom having an underside provided with a cable collecting chamber.

13. The machine of claim 12, wherein said biasing means includes an elongated bridge having a median portion constituting the first portion and two ends constituting the second portion of said biasing means, said retaining element including a post which is at least partially surrounded by the median portion of said bridge.

14. The machine of claim 12, wherein said insulator includes an annular top wall and a skirt integral with and extending downwardly from said top wall and having a plurality of openings including first openings for the second portion of said biasing means and second openings, said coupling means comprising male coupling members provided on said base and extending into said second openings.

15. The machine of claim 3, wherein said skirt comprises two projections extending in a direction away from said top wall and disposed substantially diametrically opposite each other, said first openings being provided in said projections.

16. The machine of claim 4, wherein each of said projections has a forked end portion remote from said top wall.

17. The machine of claim 3, wherein said openings further include third openings and said detent means comprises tongues provided on said skirt, extending into said third openings and engaging the marginal portion of said plate.

18. The machine of claim 6, wherein said skirt surrounds said plate and said tongues are elastically deformable and include platforms for said marginal portion and ramps adjacent said platforms and serving to guide the marginal portion toward and onto said platforms during insertion of said marginal portion into said insulator.

19. The machine of claim 12, wherein said bottom includes a raised portion having an external surface which is surrounded by said chamber.

20. The machine of claim 12, wherein said bottom further comprises means for releasably retaining convolutions of cable in said chamber.

21. The machine of claim 20, wherein said retaining means includes at least one finger extending across a portion of said chamber.

* * * * *